United States Patent
Airoldi

(10) Patent No.: US 10,495,068 B2
(45) Date of Patent: Dec. 3, 2019

(54) NACELLE FOR A WIND TURBINE INCLUDING A COOLING CIRCUIT

(71) Applicant: Siemens Wind Power A/S, Brande (DK)

(72) Inventor: Giovanni Airoldi, Aarhus (DK)

(73) Assignee: SIEMENS WIND POWER A/S (DK)

( * ) Notice: Subject to any disclaimer, the term of this patent is extended or adjusted under 35 U.S.C. 154(b) by 0 days.

(21) Appl. No.: 15/933,492

(22) Filed: Mar. 23, 2018

(65) Prior Publication Data
US 2018/0274522 A1    Sep. 27, 2018

(30) Foreign Application Priority Data
Mar. 27, 2017   (EP) .................................... 17163103

(51) Int. Cl.
*F03D 9/00* (2016.01)
*F03D 80/60* (2016.01)
(Continued)

(52) U.S. Cl.
CPC ............... *F03D 80/60* (2016.05); *F03D 1/06* (2013.01); *F03D 9/25* (2016.05); *F03D 80/82* (2016.05);
(Continued)

(58) Field of Classification Search
CPC .......... F03D 80/60; F03D 80/82; F03D 80/88; F03D 9/25; H02K 1/32; H02K 7/1838; H02K 9/02; F05B 2260/20
(Continued)

(56) References Cited

U.S. PATENT DOCUMENTS

| | | | | |
|---|---|---|---|---|
| 3,285,524 A | * | 11/1966 | Dicus Clarence H | .... B02C 2/10 241/259.1 |
| 2003/0072648 A1 | * | 4/2003 | Han | ........................ F01D 25/30 415/119 |

(Continued)

FOREIGN PATENT DOCUMENTS

| CN | 101476543 A | 7/2009 |
|---|---|---|
| CN | 102165188 A | 8/2011 |

(Continued)

OTHER PUBLICATIONS

Extended European Search Report for EP Application No. 17163103.9, dated Sep. 29, 2017.

(Continued)

*Primary Examiner* — Julio C. Gonzalez
(74) *Attorney, Agent, or Firm* — Schmeiser, Olsen & Watts, LLP

(57) ABSTRACT

A nacelle for a wind turbine includes an electrical generator having a stator and a rotor with an air gap between the stator and the rotor. The stator includes an annular support plate. A cooling circuit in the nacelle includes at least a first inlet portion for channeling a fluid cooling medium to the gap between the stator and the rotor. The first inlet portion of the cooling circuit includes at least an inlet hole on the annular support plate for letting at least a portion of the cooling medium flow towards the air gap and an inlet fan for making the fluid cooling medium flow in the inlet portion. The stator includes a circumferentially outer structure attached to the annular support plate and the cooling circuit includes at least a second outlet portion for channeling a heated fluid medium from the air gap between the stator and the rotor.

12 Claims, 2 Drawing Sheets

(51) Int. Cl.
    *F03D 80/80*     (2016.01)
    *F03D 9/25*     (2016.01)
    *H02K 9/02*     (2006.01)
    *H02K 1/32*     (2006.01)
    *H02K 7/18*     (2006.01)
    *F03D 1/06*     (2006.01)

(52) U.S. Cl.
    CPC ............... *F03D 80/88* (2016.05); *H02K 1/32* (2013.01); *H02K 7/1838* (2013.01); *H02K 9/02* (2013.01); *F05B 2260/20* (2013.01); *Y02E 10/721* (2013.01); *Y02E 10/725* (2013.01); *Y02E 10/726* (2013.01)

(58) Field of Classification Search
    USPC .................................. 290/44, 55; 310/62, 64
    See application file for complete search history.

(56) References Cited

U.S. PATENT DOCUMENTS

| | | | |
|---|---|---|---|
| 2005/0035673 A1* | 2/2005 | Lafontaine | H02K 1/187 310/58 |
| 2010/0127502 A1* | 5/2010 | Uchino | F03D 80/60 290/55 |
| 2011/0109100 A1 | 5/2011 | Versteegh | |
| 2012/0074709 A1 | 3/2012 | Cole et al. | |
| 2014/0346781 A1* | 11/2014 | Airoldi | H02K 7/1838 290/1 B |
| 2017/0074251 A1* | 3/2017 | Airoldi | F03D 80/60 |
| 2018/0080435 A1* | 3/2018 | Ma | H02K 9/26 |

FOREIGN PATENT DOCUMENTS

| | | | | |
|---|---|---|---|---|
| CN | 202187864 U | 4/2012 | | |
| CN | 102705179 A | 10/2012 | | |
| EP | 1586769 A2 | 10/2005 | | |
| EP | 2182619 A1 | 5/2010 | | |
| EP | 2958215 A1 * | 12/2015 | ............... | H02K 9/04 |
| EP | 2976829 A1 | 1/2016 | | |

OTHER PUBLICATIONS

Non-English Chinese Office Action for Application No. 201810258614.8 dated May 13, 2019.

\* cited by examiner

NACELLE FOR A WIND TURBINE INCLUDING A COOLING CIRCUIT

CROSS-REFERENCE TO RELATED APPLICATIONS

This application claims priority to European application No. EP17163103.9 having a filing date of Mar. 27, 2017, the entire contents which are hereby incorporated by reference.

FIELD OF TECHNOLOGY

The following relates to a nacelle for a wind turbine and therefore including an electrical generator driven by the blades of the wind turbine. The nacelle also includes a cooling circuit for channeling a cooling medium to the generator.

BACKGROUND

In the above described technical field, the electrical generator and in particular the stator and the rotor has to be cooled, in order to optimize its efficiency and achieve the highest possible value of generated electrical power. Various air cooling systems are known in the art for cooling the electrical generator in a nacelle for a wind turbine.

One possibility is to suck the cooling air from the outside and to direct it directly towards the generator. The main inconvenience of such solution is the moisture and salt content in the outside air, which causes corrosion in the generator, thus limiting its life. To avoid such inconvenience, a cooling circuit using the air already present inside the wind turbine may be formed. The efficiency of such solution may be however lower than the efficiency obtainable by using air from the outside ambient.

Cooling arrangements according to the above described prior art are shown in US 2017/074251 A1 and in EP 2 182 629 A1.

There may be therefore still a need for providing a new nacelle including a cooling circuit for improving the cooling of the electrical generator, in terms of efficiency and the durability of the components inside the nacelle, in particular the generator.

SUMMARY

According to embodiments of the invention there is provided a nacelle for a wind turbine comprising an electrical generator having a stator and a rotor with an air gap between the stator and the rotor, the stator including an annular support plate, a cooling circuit including at least a first inlet portion for channeling a fluid cooling medium to the gap between the stator and the rotor, wherein the first inlet portion of the cooling circuit comprises at least an inlet hole on the annular support plate for letting at least a portion of the cooling medium flow towards the air gap and an inlet fan for making the fluid cooling medium flow in the inlet portion. The stator includes a circumferentially outer structure attached to the annular support plate and the cooling circuit includes at least a second outlet portion for channeling an heated fluid medium from the gap between the stator and the rotor, the second outlet portion comprising at least an outlet hole on the circumferentially outer structure for letting the heated fluid medium flow from the air gap and an outlet fan for making the heated medium flow in the outlet portion of the cooling circuit.

The cooling circuit provided in the nacelle of embodiments of the invention comprises a first inlet portion which may be used for channeling a fluid cooling medium, in particular ambient air, from the outside of the nacelle to the air gap between the stator and the rotor, through an hole provided in the stator. The first inlet portion may be provided, in possible embodiment of embodiments of the invention, with one or more filters for removing mist and ice from the fluid cooling medium. This allows to combine the advantages of the two air cooling system described with reference to the known prior art.

Advantageously, one or more additional holes may be provided in the stator for channeling the fluid medium heated in the air between the stator and the rotor towards the outside of the nacelle. This helps in providing compact solution both for the electrical generator and the cooling circuit.

According to an embodiment of the invention the circumferentially outer structure of the stator has a fork shape with two slanted portions departing from a circumferential border of the annular support plate, the outlet hole being provided on one of the slanted portions.

Advantageously the circumferentially outer structure of the stator may be used with the double function of accommodating the stator segments and allowing the flow of the fluid medium heated in the air between the stator and the rotor.

According to a further embodiment the cooling circuit includes a bypass connecting the first inlet portion of the cooling circuit and the second outlet portion (120) of the cooling circuit. In particular, the bypass may be connected to the second outlet portion between the outlet fan and the outlet opening.

One or more valves may be used in first inlet portion and/or the second outlet portion and/or in the bypass for controlling the flow of the cooling medium in the cooling circuit, in particular for controlling the amount of heated cooling medium flowing in the bypass.

Advantageously the fluid medium heated in the air between the stator and the rotor may be used to be mixed with the fresh cooling medium entering the nacelle. This may help in reducing the humidity percentage of the cooling medium entering the nacelle with the purpose of facilitating the formation of salt crystals in the cooling medium, to be more easily stop before they reach the electrical generator.

The reduction in relative humidity allows the salt dissolved in the wet air to crystallize. Salt would start crystallizing only below a value of relative humidity (around 60%). Therefore the humidity of the air incoming the filter should be kept below this limit. Once the salt is crystallized, standard inexpensive filters with low air pressure drop can be used instead of more expensive ones which allow removing salts from air with a higher humidity.

According to a further embodiment the first inlet portion of the cooling circuit comprises a mixing chamber upstream the filter and an inlet fan downstream the filter.

Advantageously a mixing chamber is introduced before the filter to increase the residence time of the air at a certain temperature and its mixing. This facilitates the salt crystallization. A further advantage of this layout is the position downstream the filter of the inlet fan, which is therefore not exposed to salt. This allows for an extension of the lifetime of the inlet fan and for a less expensive fan complying with a lower corrosion class environment.

According to a further embodiment at least on silencer is provided along the first inlet portion or the second outlet portion of the cooling circuit.

Silencers allow noise reduction, in case this is necessary to comply with noise regulations. The aspects defined above and further aspects of embodiments of the invention are apparent from the examples of embodiment to be described hereinafter and are explained with reference to the examples of embodiment. The invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein.

DETAILED DESCRIPTION

Figure 1:
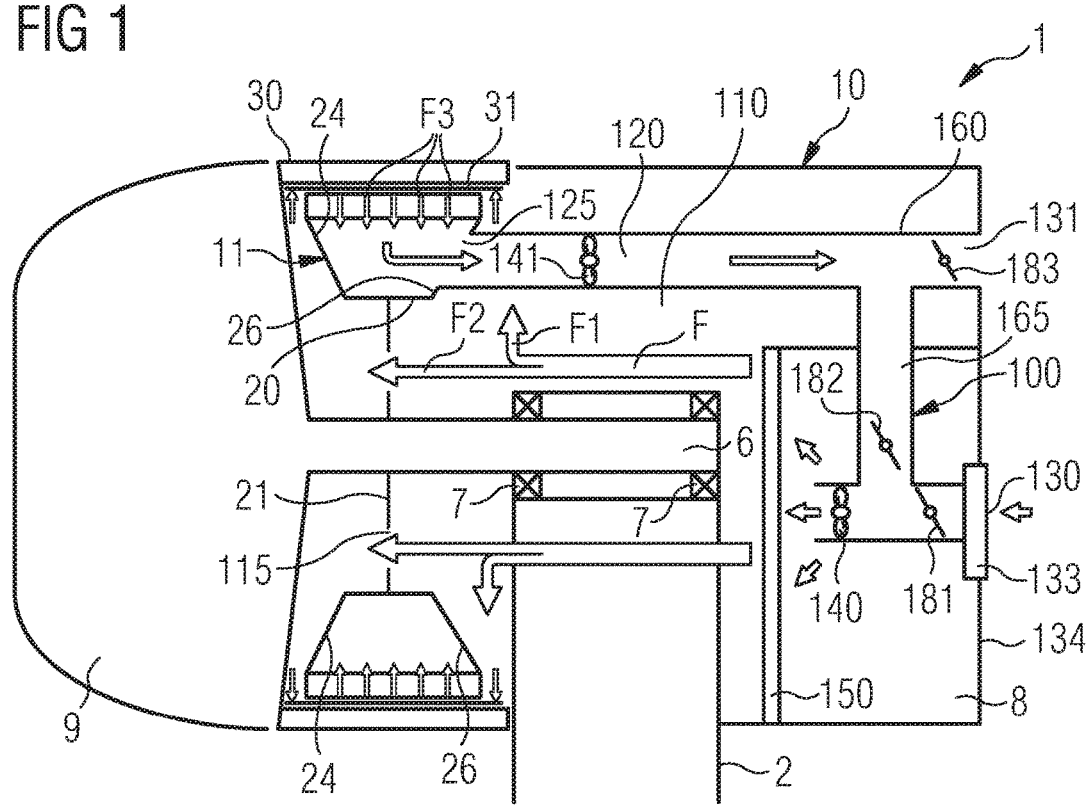
FIG. 1 shows a schematic section of an upper of a wind turbine including a nacelle, in accordance with embodiments of the present invention.

The illustrations in the drawings are schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a wind turbine 1 having a nacelle 10 according to embodiments of the invention. The wind turbine 1 comprises a tower 2, which is mounted on a non-depicted fundament. The nacelle 10 is arranged on top of the tower 2. Between the tower 2 and a main body 8 of the nacelle 10 a yaw angle adjustment device is provided, which is capable of rotating the nacelle 10 around a not depicted vertical axis, which is aligned basically with the longitudinal extension of the tower 2. By controlling the yaw angle adjustment device in an appropriate manner it can be made sure, that during a normal operation of the wind turbine 1 the nacelle 10 is always properly aligned with the current wind direction.

On a front end of the body 8 of the nacelle 10, a hub 9 having three blades (not represented in the attached drawings) is provided.

The hub 9 is rigidly coupled to a rotatable shaft 6. A schematically depicted bearing assembly 7 is provided in the nacelle 10 in order to support the rotation of the rotatable shaft 6 and of the hub 9 coupled thereto, with respect to the body 8 of the nacelle 10.

The nacelle 10 comprises an electric generator 11, located at the front end of the nacelle 10 between the hub 9 and the body 8 of the nacelle 10. In accordance with the basic principles of electrical engineering the electric generator 11 comprises a stator assembly 20 and a rotor assembly 30.

The rotor assembly 30 is rigidly coupled to the rotatable shaft 6 and rotates solidly with it around the bearing assembly 7. The stator assembly 20 is instead rigidly fixed to the body 8 of the nacelle 10. Around a circumferentially border of the stator assembly 20 an air gap 31 is provided between the stator assembly 20 and the rotor assembly 30. In operation the temperature in the air gap 31 rises. Such temperature has to be controlled beyond a limit to assure to keep the efficiency of the generator within acceptable values.

To achieve such scope, inside the body 8 of the nacelle 10 a cooling circuit 100 is provided for channeling a fluid cooling medium to the air gap 31 and channeling the same fluid cooling medium away from the air gap 31, after it has been heated in the air gap 31. In such a way the fluid cooling medium extracts heat from the air gap 31. According to a typical embodiment of the present invention, the fluid cooling medium is ambient air surrounding the nacelle 10.

The cooling circuit 100 includes a first inlet portion 110 for channeling the fluid cooling medium to the air gap 31.

The inlet portion 110 extends from an inlet opening 130 in an outer wall 134 of the body 8 of the nacelle 10 to the air gap 31. According to the embodiment of FIG. 1, the inlet opening 130 is provided on a rear end of the body 8 of the nacelle 10, opposite to the hub 9. On the inlet opening 130 a mist eliminator 133 is provided for reducing or eliminating the mist content in the fluid cooling medium entering the body 8 of the nacelle 10 through the inlet opening 130.

Downstream the mist eliminator 133 an inlet fan 140 is provided for making the fluid cooling medium flow in the inlet portion 110 of the cooling circuit 100. Downstream the inlet fan 140 a filter 150 is provided for blocking solid particles, for example dust and/or dust, contained in the fluid cooling medium.

Downstream the filter 150 the fluid cooling medium proceeds according to an axial flow (represented by the main arrow F in FIG. 1) substantially parallel to the rotatable shaft 6. This flow is divided downstream into two sub-flows, one flowing directly to the air gap 31 (represented by the arrow F1 in FIG. 1) and the other (represented by the arrow F2 in FIG. 1) flowing to the air gap 31 through a plurality of inlet holes 115 provided on an inner annular support plate 21 of the stator assembly 20.

Figure 3:
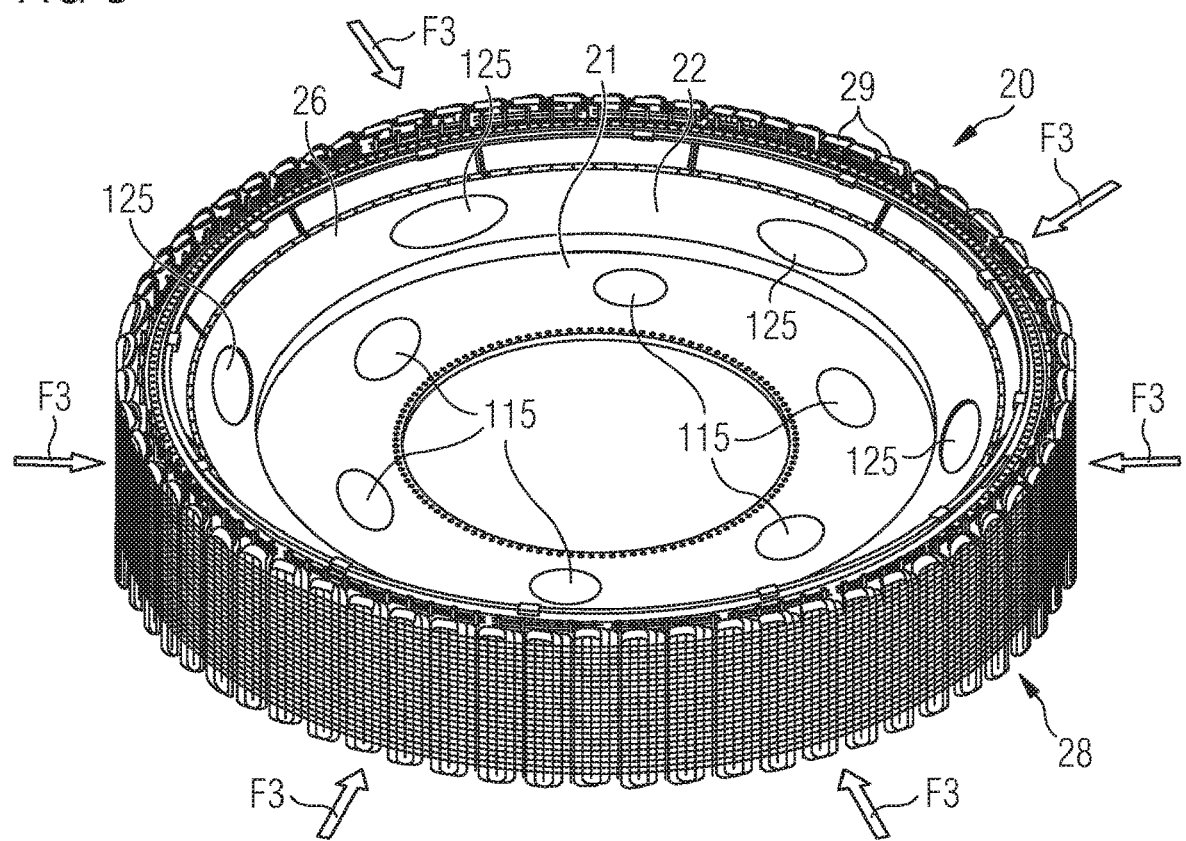
FIG. 3 shows a stator assembly including the stator element of FIG. 2.

After being heated in the air gap 31, the fluid cooling medium enters the stator assembly 20 radially, i.e. according to a direction substantially orthogonal to the rotatable shaft 6 (represented by the arrows F3 in FIGS. 1 and 3).

The cooling circuit 100 includes a second outlet portion 120 for channeling the heated fluid medium away from the air gap 31. The second outlet portion 120 comprises a plurality of outlet holes 125 arranged on a circumferentially outer structure 22 attached to the annular support plate 21 of the stator assembly 20. The outlet holes 125 let the heated fluid medium flow from away the air gap 31, in order to extract heat from the electrical generator 11.

Downstream the outlet holes 125, the outlet portion 120 of the cooling circuit 100 comprises a duct 160 connecting the outlet holes 125 to an outlet opening 131 provided on the outer wall 134 of the body 8 of the nacelle 10. According to the embodiment of FIG. 1, the outlet opening 131 is provided on a rear end of the body 8 of the nacelle 10, opposite to the hub 9. Through the outlet opening 131 the heated fluid medium is released in the ambient environment surrounding the nacelle 10.

Between the outlet holes 125 and the outlet opening 131 an outlet fan 141 is provided for making the heated medium flow in the outlet portion 120 of the cooling circuit 100.

The cooling circuit 100 further includes a bypass 165 connecting the first inlet portion 110 and the second outlet portion 120 of the cooling circuit 100. The bypass 165 is connected to the first inlet portion 110 between inlet opening 130 and the inlet fan 140. The bypass 165 is connected to the second outlet portion 120 between the outlet fan 141 and the outlet opening 131. The mixing of the fresh cooling medium entering the nacelle 10 with the heated cooling medium flowing from the air gap 31 provides a preheating of the fluid cooling medium in the first inlet portion 110 and a reduction of the value of relative humidity. A lower value of relative humidity may facilitate the formation of ice crystals in the humid air entering the nacelle. Such ice crystals are then more easily blocked in the filter 150, so that they are prevented from reaching the electrical generator 11.

Three valves 181, 182, 183 are respectively provided the first inlet portion 110, in the bypass 165 and in the second outlet portion 120 for controlling the flow of the cooling medium in cooling circuit 100.

The first valve 181 is provided the first inlet portion 110 of the cooling circuit 100, upstream the bypass 165, for controlling the flow of the cooling medium in the first inlet portion 110 and, in particular for closing the inlet portion 110 of the cooling circuit 100 in case of inactivity of the electrical generator 11.

The second valve 182 is provided the bypass 165 for controlling the flow of the heated cooling medium in the bypass 165. In this way the pre-heating of the cooling medium entering the first inlet portion 110 can be controlled.

The third valve 182 is provided the second outlet portion 120 of the cooling circuit 100, downstream the bypass 165, for controlling the flow of the cooling medium in the second outlet portion 120 and, in particular for closing the outlet portion 120 of the cooling circuit 100 in case of inactivity of the electrical generator 11.

Figure 2:
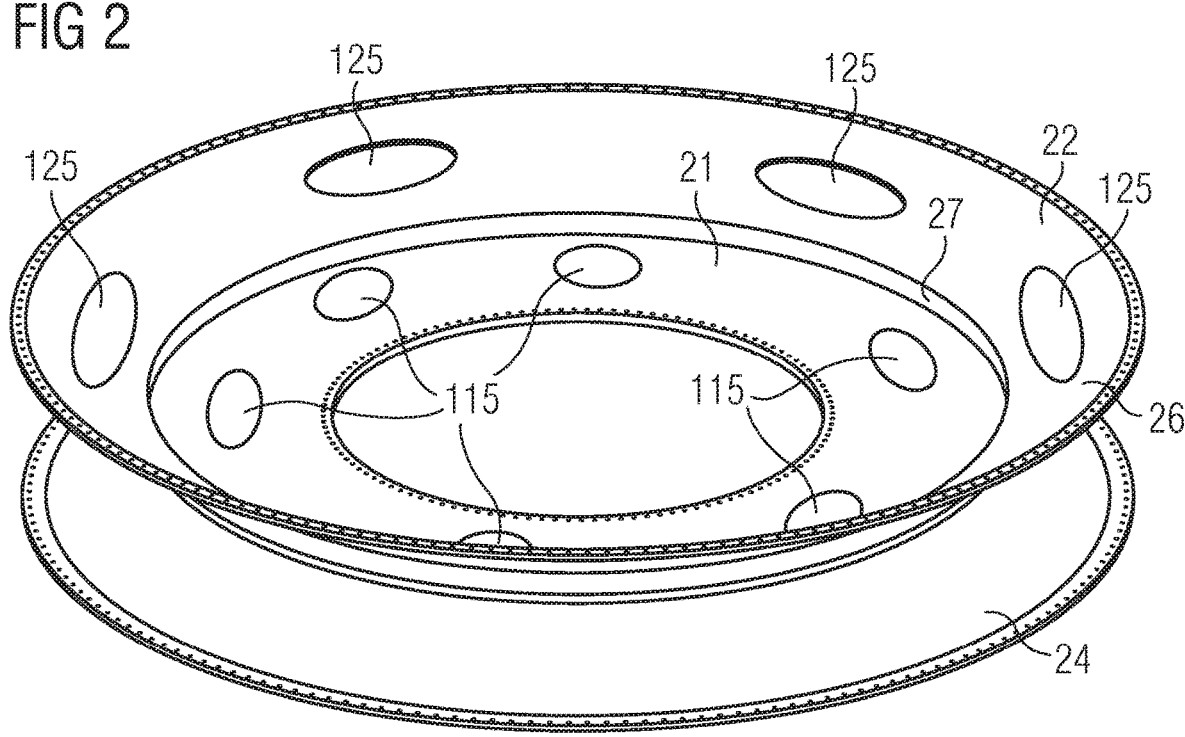
FIG. 2 shows a stator structural element of the nacelle, in accordance with embodiments of the present invention.

FIGS. 2 and 3 show in more detail the stator assembly 20.

The stator assembly 20 is an annular structure which is located in a concentric manner with regard to the rotational axis 6. The stator assembly 20 comprises the inner annular support plate 21 which surrounds a non-depicted bearing assembly, which provides rotational support between the rotational axis 6 and the stator assembly 20.

The plurality of inlet holes 115 are provided on the inner annular support plate 21 of the stator 20, regularly distributed around an axis of the annular stator 20, i.e. regularly distributed around the rotational axis 6.

The circumferentially outer structure 22 is attached and surrounds the inner annular support plate 21.

The circumferentially outer structure 22 has a fork shape with two slanted portions 24, 26 departing from a circumferential border 27 of the annular support plate 21. The circumferentially outer structure 22 of the stator 20 is used for accommodating the stator segments 28 each having several electric coils or windings 29. The entire circumference respectively the entire radially outer edge of the stator assembly 20 is covered with these stator segments 28.

The two slanted portions 24, 26 may be distinguished in a forward slanted portion 24 oriented towards the hub 9 and a rearward slanted portion 26 oriented in opposite direction towards the rear end of the body 8 of the nacelle 10.

The plurality of plurality of outlet holes 125 are provided on rearward slanted portion 26 of the stator 20, regularly distributed around an axis of the annular stator 20, i.e. regularly distributed around the rotational axis 6.

Figure 4:
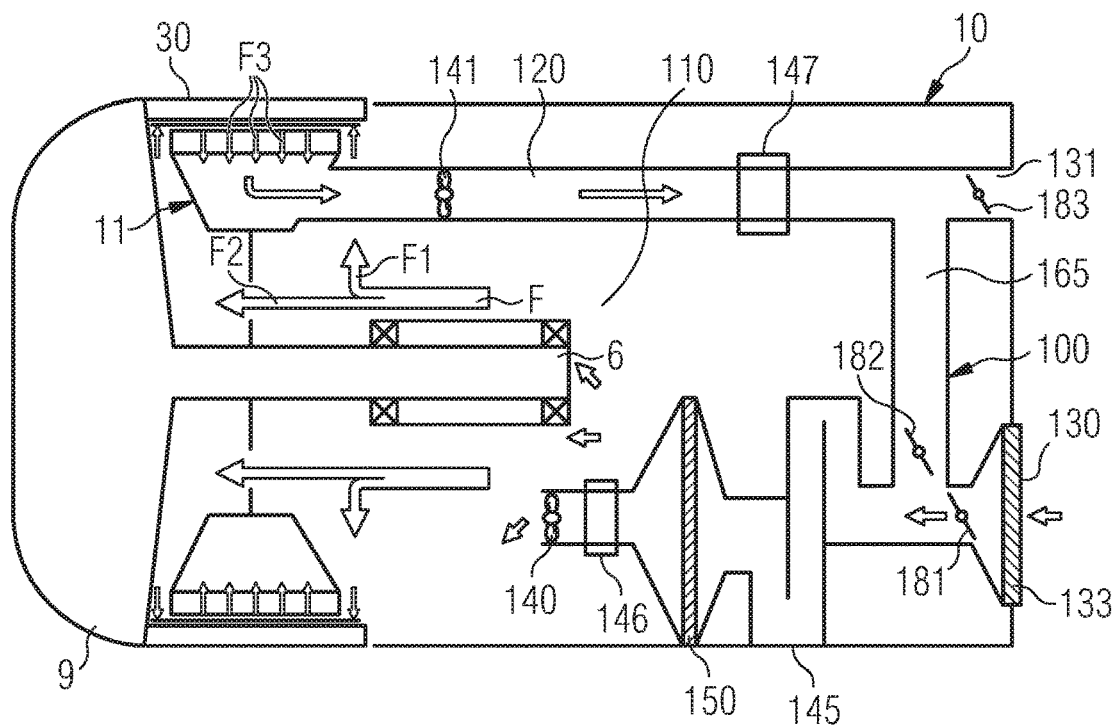
FIG. 4 shows a schematic section of an upper of a wind turbine including a nacelle, in accordance with embodiments of the present invention.

FIG. 4 shows a wind turbine 1 having another embodiment of the nacelle 10 according to the invention.

In comparison to the first embodiment of FIG. 1, the embodiment of FIG. 4 differentiates itself in that:
 the first inlet portion 110 comprises a mixing chamber 145 upstream the filter 150 and downstream the bypass 165,
 the inlet fan 140 is provided downstream the filter 150,
 a first silencer 146 is provided between the inlet fan 140 and the filter 150,
 the first inlet portion 110 comprises a second silencers 147 downstream the outlet fan 141 and upstream the bypass 145.

The mixing chamber 145 increases the residence time of the air at a certain temperature and its mixing, in order to facilitate the salt crystallization. The filter fan 140 positioned downstream the filter 150 is therefore not exposed to salt.

Silencers 146, 147 allow noise reduction, in case this is necessary to comply with noise regulations.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A nacelle for a wind turbine comprising:
 an electrical generator having a stator and a rotor with an air gap between the stator and the rotor, the stator including an annular support plate;
 a cooling circuit including at least a first inlet portion for channeling a fluid cooling medium to the air gap between the stator and the rotor;
 wherein the first inlet portion of the cooling circuit comprises at least an inlet hole on the annular support plate for letting at least a portion of the fluid cooling medium flow towards the air gap and an inlet fan for making the fluid cooling medium flow in the inlet portion,
 wherein the stator includes a circumferentially outer structure attached to the annular support plate and the cooling circuit includes at least a second outlet portion for channeling a heated fluid medium from the air gap between the stator and the rotor, the second outlet portion comprising at least an outlet hole on the circumferentially outer structure for letting the heated fluid medium flow from the air gap and an outlet fan for making the heated medium flow in the outlet portion of the cooling circuit;
 wherein the first inlet portion of the cooling circuit comprises a filter upstream the stator inlet hole, and the first inlet portion of the cooling circuit comprises a mixing chamber upstream the filter and the inlet fan downstream the filter.

2. The nacelle of claim 1, wherein the circumferentially outer structure has a fork shape with two slanted portions departing from a circumferential border of the annular support plate, the outlet hole being provided on one of the slanted portions.

3. The nacelle of claim 1, wherein first inlet portion of the cooling circuit comprises an inlet opening in an outer wall of the nacelle upstream the inlet fan.

4. The nacelle of claim 1, wherein the cooling circuit includes a bypass connecting the first inlet portion of the cooling circuit and the second outlet portion of the cooling circuit.

5. The nacelle of claim 4, wherein the bypass is connected to the first inlet portion between the inlet opening and the inlet fan and/or between the inlet opening and the mixing chamber.

6. The nacelle of claim 5, wherein at least a valve in first inlet portion and/or the second outlet portion and/or in the bypass for controlling the flow of the cooling medium in the cooling circuit.

7. The nacelle of claim 4, wherein the bypass is connected to the second outlet portion between the outlet fan and the outlet opening.

8. The nacelle of claim 1, wherein the second outlet portion of the cooling circuit comprises an outlet opening in an outer wall of the nacelle and a duct connecting the outlet hole on the circumferentially outer structure to the outlet opening.

9. The nacelle of claim 1, wherein a plurality of inlet holes is provided on the stator, distributed around an axis of the stator.

10. The nacelle of claim 1, wherein a plurality of plurality of outlet holes is provided on the stator, distributed around an axis of the stator.

11. The nacelle of claim 1, wherein the stator is coaxial with the rotor.

12. The nacelle of claim 1, wherein the first inlet portion and/or the second outlet portion of the cooling circuit comprises at least on silencer.

\* \* \* \* \*